US011873929B2

(12) United States Patent
Hann

(10) Patent No.: US 11,873,929 B2
(45) Date of Patent: Jan. 16, 2024

(54) MULTI-DIAMETER CLIP

(71) Applicant: ILLINOIS TOOL WORKS INC., Glenview, IL (US)

(72) Inventor: Mark S. Hann, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/690,832

(22) Filed: Mar. 9, 2022

(65) Prior Publication Data

US 2022/0307626 A1 Sep. 29, 2022

Related U.S. Application Data

(60) Provisional application No. 63/177,181, filed on Apr. 20, 2021, provisional application No. 63/166,011, filed on Mar. 25, 2021.

(51) Int. Cl.
*F16L 3/13* (2006.01)
*F16L 3/10* (2006.01)
(Continued)

(52) U.S. Cl.
CPC .............. *F16L 3/13* (2013.01); *F16L 3/1041* (2013.01); *F16L 3/223* (2013.01); *F16L 55/035* (2013.01); *B60R 16/0215* (2013.01); *B60R 16/08* (2013.01)

(58) Field of Classification Search
CPC . F16L 3/13; F16L 3/1041; F16L 3/223; F16L 55/035; F16L 3/237; B60R 16/0215; B60R 16/08; H02G 3/045
See application file for complete search history.

(56) References Cited

U.S. PATENT DOCUMENTS 5,271,587 A * 12/1993 Schaty ............... H02G 3/26
248/74.1
6,371,419 B1 * 4/2002 Ohnuki .............. F16L 3/13
248/74.2
(Continued)

FOREIGN PATENT DOCUMENTS

CN 103899845 A * 7/2014 ............... F16B 2/20
WO WO-2017014856 A1 * 1/2017 ......... B60R 16/0215

OTHER PUBLICATIONS

Jetpress triple drive rivet cable clip online product page dated Jan. 24, 2021 by web.archive.org, weblink: https://www.jetpress.com/component-and-fastener-products/drive-rivet-cable-clips-triple (Year: 2021).*

*Primary Examiner* — Terrell L McKinnon
*Assistant Examiner* — Ding Y Tan
(74) *Attorney, Agent, or Firm* — Quarles & Brady LLP

(57) ABSTRACT

A routing clip assembly is configured to secure a tube to a structure. The assembly includes a clip having a main body, and at least one tube-retaining section is defined on a lateral side of the main body. The tube retaining section includes a channel adapted for receipt of the tube. The channel defines a channel axis and is configured to accommodate a variety of tube diameters. The channel includes at least two pairs of fingers, wherein each finger of a given pair connects to the body at a respective hinge on a side of the channel opposite the other finger of the pair. Further, each of the fingers has a distal end that extends generally toward the channel axis. The at least two pairs of fingers are configured to flex between a closed position and an open position to permit insertion of the tube into the channel.

21 Claims, 11 Drawing Sheets

(51) Int. Cl.
  *F16L 55/035*   (2006.01)
  *F16L 3/223*   (2006.01)
  *B60R 16/08*   (2006.01)
  *B60R 16/02*   (2006.01)

(56) References Cited

U.S. PATENT DOCUMENTS

| | | | | |
|---|---|---|---|---|
| 6,641,093 | B2* | 11/2003 | Coudrais | B60R 16/0215 |
| | | | | 248/68.1 |
| 2004/0065785 | A1* | 4/2004 | Miura | F16L 3/223 |
| | | | | 248/62 |
| 2004/0113027 | A1* | 6/2004 | Nakanishi | F16L 55/035 |
| | | | | 248/68.1 |
| 2004/0144897 | A1* | 7/2004 | Maruyama | F16B 21/071 |
| | | | | 248/68.1 |
| 2005/0001108 | A1* | 1/2005 | Stigler | F16L 3/223 |
| | | | | 248/68.1 |
| 2005/0253025 | A1* | 11/2005 | Benoit | F16L 3/13 |
| | | | | 248/74.1 |
| 2007/0134073 | A1* | 6/2007 | Shereyk | F16B 21/084 |
| | | | | 411/510 |
| 2011/0049312 | A1* | 3/2011 | Kato | F16L 55/035 |
| | | | | 248/74.1 |
| 2016/0053918 | A1* | 2/2016 | Flynn | F16L 3/237 |
| | | | | 248/68.1 |
| 2023/0124107 | A1* | 4/2023 | Chlystek | F16L 3/13 |
| | | | | 248/63 |

* cited by examiner

MULTI-DIAMETER CLIP

CROSS-REFERENCE TO RELATED APPLICATIONS

This application claims priority to U.S. Provisional Patent Application No. 63/166,011 filed Mar. 25, 2021, and to U.S. Provisional Patent Application No. 63/177,181 filed Apr. 20, 2021, the entirety of which are incorporated herein by reference.

FIELD OF THE DISCLOSURE

Embodiments of the present disclosure generally relate to routing clips or routing clip assemblies that are configured to securely connect tubes, pipes, conduits or the like to an object. More particularly, routing clips of the present disclosure are configured to accommodate a variety of tube diameters while maintaining consistent alignment of the tube.

BACKGROUND

Various components, such as conduits and tubes, may be secured to surfaces, such as walls, ceilings, or the like, through routing clip assemblies. For example, a cylindrical tube may be secured to a wall through a routing clip assembly having a tube-retaining channel that snapably, latchably, or otherwise secures a portion of the tube. The routing clip itself is then secured within an aperture in the object by way of an anchoring member, such as, for example, a pine-tree fastener or a threaded bolt, which may be formed integrally with the routing clip. Optionally, the routing clip may not include an integral anchoring member and another component that may be used to anchor the routing clip assembly to a vehicle component.

Following insertion of a tube into the channel of the routing clip, the tube must be held firmly to prevent accidental dislodgment. Further, a routing clip assembly must mitigate relative movement between the tube and the routing clip. For example, a tube comprising a brake line or fuel line can fail prematurely from mechanical stresses resulting from relative movement between the tube and the routing clip even if the stresses do not cause a complete dislodgment of the tube from the routing clip. However, the channels within routing clip assemblies are typically configured to retain tubes having a particular diameter. As such, the channels may not be able to accommodate tubes having smaller or larger diameters. For example, a tube having an outer diameter that is smaller than the inner diameter of the channel may axially shift within the channel. Accordingly, such routing clips may be incapable of securely retaining tubes having relatively smaller diameters. Conversely, a tube having an outer diameter that is larger than the inner diameter of the channel is typically unable to fit within the channel. As such, the routing clip may be incapable of even receiving the tube. Therefore, a need exists for a tube-retaining clip that can accommodate a variety of tube sizes while maintaining proper alignment of the tube and mitigating relative movement between the tube and the clip.

SUMMARY OF THE INVENTION

In some aspects, the present disclosure provides for a routing clip assembly configured to secure a tube to a structure. The assembly includes a clip having a main body, and at least one tube-retaining section is defined on the main body. The at least one tube-retaining section includes a channel configured to accommodate a variety of tube diameters, and a tube is received within the channel. The channel defines a channel axis. A first pair of fingers are spaced apart from a second pair of fingers along the channel axis. Each finger of the first and second pairs mirrors the other finger of the given pair. Each finger connects to the body by a respective hinge, extends within the channel, and terminates at a distal end, wherein each finger is configured to flex about its respective hinge between a closed position and an open position to permit insertion of the tube into the channel. The first pair of fingers is configured to accommodate a first range of tube diameters, and the second pair is configured to accommodate a second range of tube diameters that differs from the first range. When the tube received within the channel has a diameter that exceeds the first range, the first pair of fingers is in the open position, and at least one other pair of fingers is in the closed position.

In some embodiments, the distal ends of at least one pair of fingers are configured to abut directly against the tube in a radial configuration to retain the tube within the channel.

In some embodiments, the distal ends of at least one pair of fingers are contoured, such that the distal ends have a concave shape that is configured to conform to a curved outer surface of the tube. In other embodiments, the distal ends may not be contoured.

In some embodiments, the at least one pair of fingers includes abutment surfaces that are spaced from the distal ends, and the abutment surfaces are configured to tangentially abut against the tube to mitigate movement of the tube relative to the clip body.

In other embodiments, the abutment surfaces are contoured, such that the abutment surfaces have a concave shape that conforms to the curved outer surface of the tube. In different embodiments, the first pair of fingers includes abutment surfaces spaced from the distal ends, and when the tube diameter exceeds the first range, the abutment surfaces of the first pair tangentially abut against the tube to mitigate movement of the tube relative to the clip body. In still other embodiments, the tube retaining section further includes a third pair of fingers disposed adjacent to one of the first and second pairs, wherein the first, second, and third pairs are axially spaced along the channel. In yet other embodiments, the third pair of fingers is configured to accommodate a third range of tube diameters that differs from the first range and the second range.

In some embodiments, when the tube that is received within the channel has a diameter that exceeds the first range, the first pair of fingers is in the open position, the second pair of fingers is in the open position, and the third pair of fingers is in the closed position. The distal ends of the third pair radially abut against the tube to retain the tube within the channel, and the abutment surfaces of the first pair tangentially abut against the tube to mitigate movement of the tube relative to the clip body.

In another aspect, the present disclosure provides a routing clip assembly. The routing clip assembly includes a routing clip configured to receive a tube. The routing clip includes a body, and one or more tube-retaining sections are defined on the body. Each tube-retaining section includes a channel adapted for receipt of the tube. The channel defines a channel axis and is configured to accommodate a variety of tube diameters. The clip includes a first pair of fingers being disposed on opposing sides of the channel. The fingers of the first pair connect to the body at respective hinges and include distal ends that extend within the channel. Each finger of the first pair has a first length defined between the hinge and the distal end, and the first length is configured to accommodate a first range of tube diameters. Each finger of the first pair includes a concave abutment surface that is spaced from the distal end, wherein, for a tube diameter that exceeds the first range, the concave abutment surface is configured to tangentially abut against the tube when the tube is received within the channel.

In some embodiments, the clip further includes a second pair of fingers. The second pair of fingers are disposed on opposing sides of the channel, and the second pair of fingers are axially spaced from the first pair. The second pair of fingers are connected to the body at respective hinges and include distal ends that extend within the channel. Each finger of the second pair of fingers has a second length that is defined between each respective hinge and distal end, wherein the second length is configured to accommodate a second range of tube diameters, wherein the second length is different from the first length.

In other embodiments, each finger of the second pair includes a concave abutment surface that is spaced from the distal end, wherein, for a tube diameter that exceeds the second range, the concave abutment surface is configured to tangentially abut against the tube when the tube is received within the channel. In still other embodiments, the clip further includes a third pair of fingers. The fingers of the third pair are axially spaced from the first and second pairs. Each finger of the third pair connects to the body at a respective hinge disposed along opposing sides of the channel, and distal ends of the third pair extend within the channel. Each finger of the third pair has a third length that is defined between the hinge and the distal end, wherein the third length is configured to accommodate a third range of tube diameters, the third length being different than the first and second lengths.

In some embodiments, the distal ends of the at least one pair of fingers are contoured, such that the distal ends have a concave shape and conform to a curved outer surface of a tube. In different embodiments, the routing clip further includes a shank formed integrally with and extending from the body. The shank includes a proximal end in connection with the body and a distal tip spaced apart from the body. The shank includes a plurality of flexible flanges that extend radially outward from the shank between the proximal end and the distal tip. The shank is configured to be inserted through an aperture in an object, wherein at least one of the flanges abuts against an interior edge of the aperture to retain the clip in connection with the object.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Figure 1:
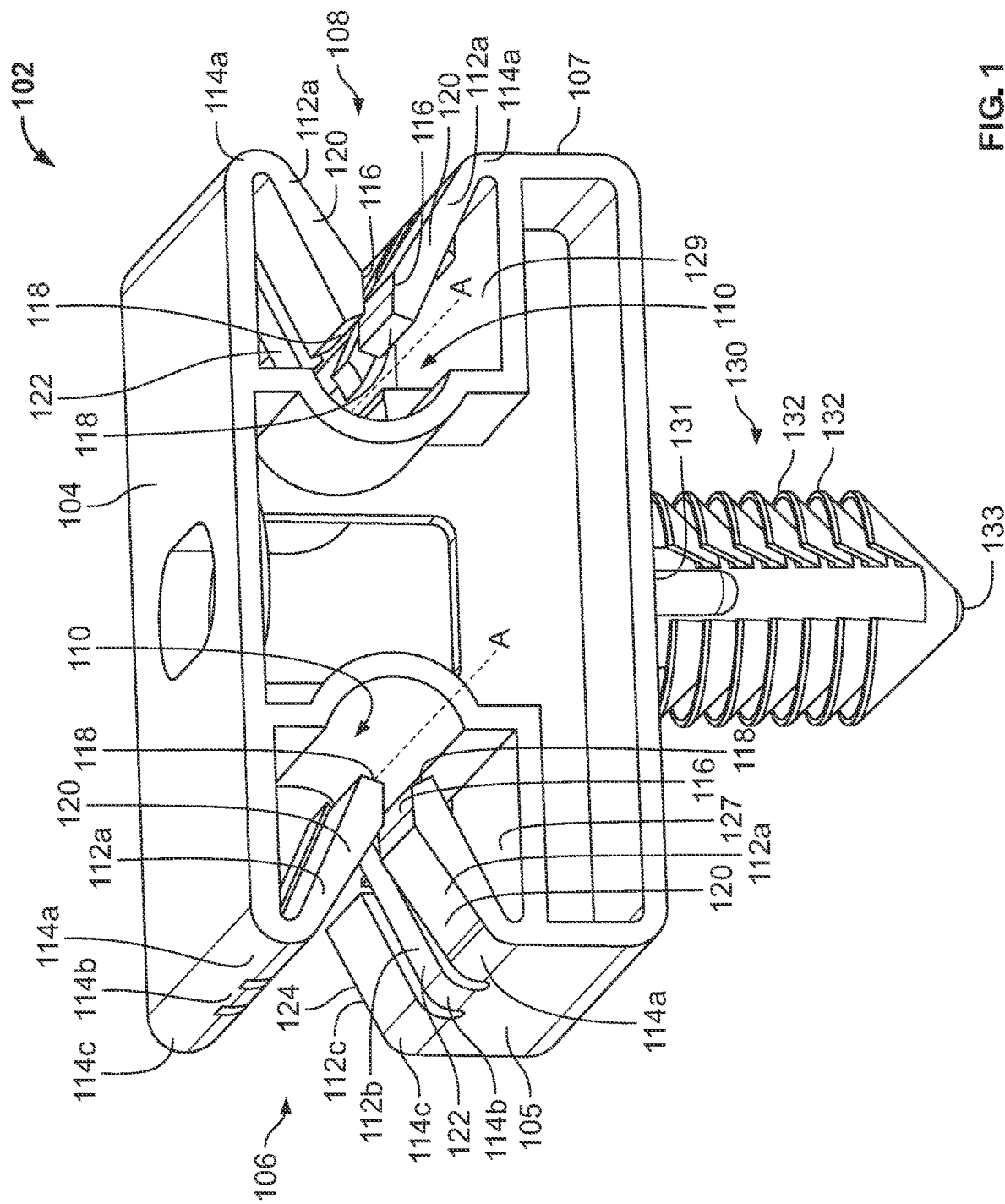
FIG. 1 is a top, front, and right isometric view of an exemplary embodiment of a routing clip assembly in a first configuration.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. It is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Aspects of the present disclosure provide a fastening assembly that is configured to be used to mate components of an assembly. For example, the fastening assembly according to the present disclosure may be particularly useful when mating a tube with a panel, a wall, or other component. The present disclosure provides a routing clip assembly 100 that is configured to secure one or more cables, tubes, or other cylindrical objects 200 to a separate object or article of manufacture. The assembly includes a routing clip 102 having a main body 104, and at least one tube-retaining section 106, 108 is defined on the main body 104. Each tube-retaining section 106, 108 includes a channel 110 configured for receipt of the tube 200.

FIG. 1 illustrates an isometric view of the tube-retaining clip (or routing clip) 102, according to the present embodiment. The clip 102 may be formed of injection molded plastic, for example. Alternatively, the clip 102 may be formed of various other materials, such as, e.g., rubber or other elastomeric materials, metal, or the like. Additionally, the clip 102 may be integrally molded and formed as an integral piece of injection molded plastic, for example, or the clip 102 may be formed of more than one of the materials noted above.

The routing clip 102 of FIG. 1 includes a main body 104 including two tube-retaining sections 106, 108, which may be disposed on opposing lateral sides 105 and 107 of the clip 102. Each of the tube-retaining sections 106, 108 includes a channel 110 that is configured for receipt of one of the tubes 200 (e.g., as shown in FIGS. 2-9C), and the channels 110 can accommodate a variety of tube diameters. While two retaining sections 106, 108 are depicted, one or more tube retaining sections may be utilized. The main body 104 may also be integrally connected with a retaining shank 130, which may comprise a pine-tree fastener, as shown in the present embodiment. In other embodiments, other structures or methods may be used to secure the clip 102 (or clip assembly 100) to an object.

As further illustrated in FIG. 1, the shank 130 includes a proximal end 131 in connection with the main body 104 and a distal tip 133 disposed at a location spaced from the main body 104. The outer surface of the shank 130 includes a plurality of flexible flanges 132 that are radially and axially disposed along the shank 130 between the proximal end 131 and the distal tip 133. After being inserted through the aperture of the object, the flexible flanges 132 are configured to abut against an interior edge of the aperture to retain the clip 102 with the object.

Still referring to FIG. 1, each of the tube-retaining sections 106 and 108 may include first 120, second 122, and third 124 pairs of fingers 112a, 112b, 112c, respectively, that are disposed adjacent one another and on both sides of channel 110. Each of the fingers 112a, 112b, 112c are connected to the body at hinges 114a, 114b, 114c, respectively. The fingers 112a, 112b, 112c are configured to flex from a closed toward an open position to permit insertion of the tube into the channel 110. In FIG. 1, for example, each pair 120, 122, and 124 of fingers 112a, 112b, 112c is shown in the closed position, and the distal ends 118 of the fingers 112a, 112b, 112c extend generally toward a central axis "A" of the channel 110. Alternative embodiments may include more or fewer fingers 112a, 112b, 112c. Each of the fingers 112a, 112b, 112c of a respective pair thereof (any of 120, 122, or 124) mirrors the opposing finger 112a, 112b, 112c of the given pair 120, 122, or 124, and each contact finger terminates at a distal end 118. However, in alternative embodiments, the respective opposing fingers 112a, 112b, 112c need not be mirror images of one another.

Figure 2:
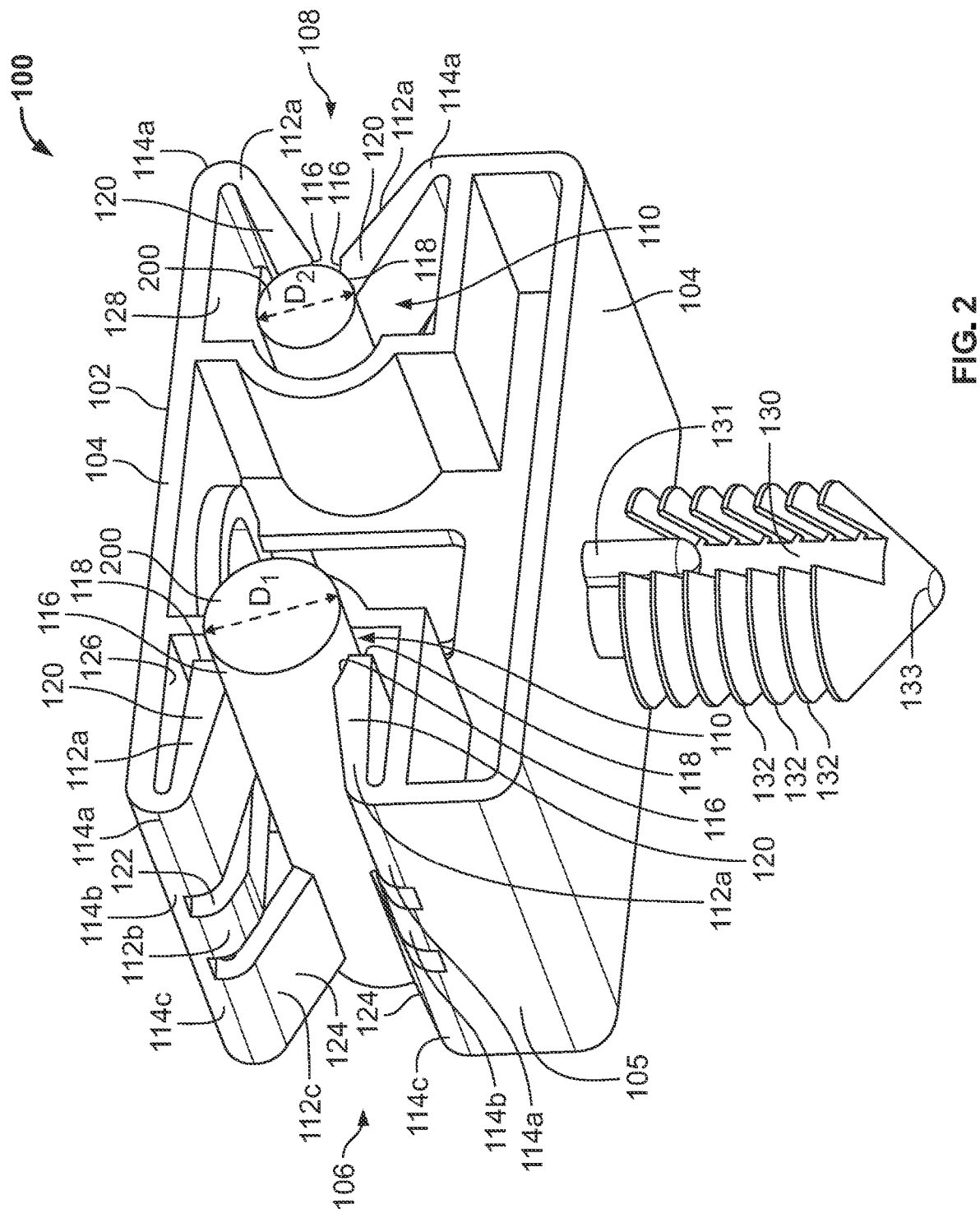
FIG. 2 is a bottom, front, and right isometric view of a routing clip assembly comprising the routing clip of FIG. 1 in a second configuration having two tubes with different diameters retained therein.
Figure 3:
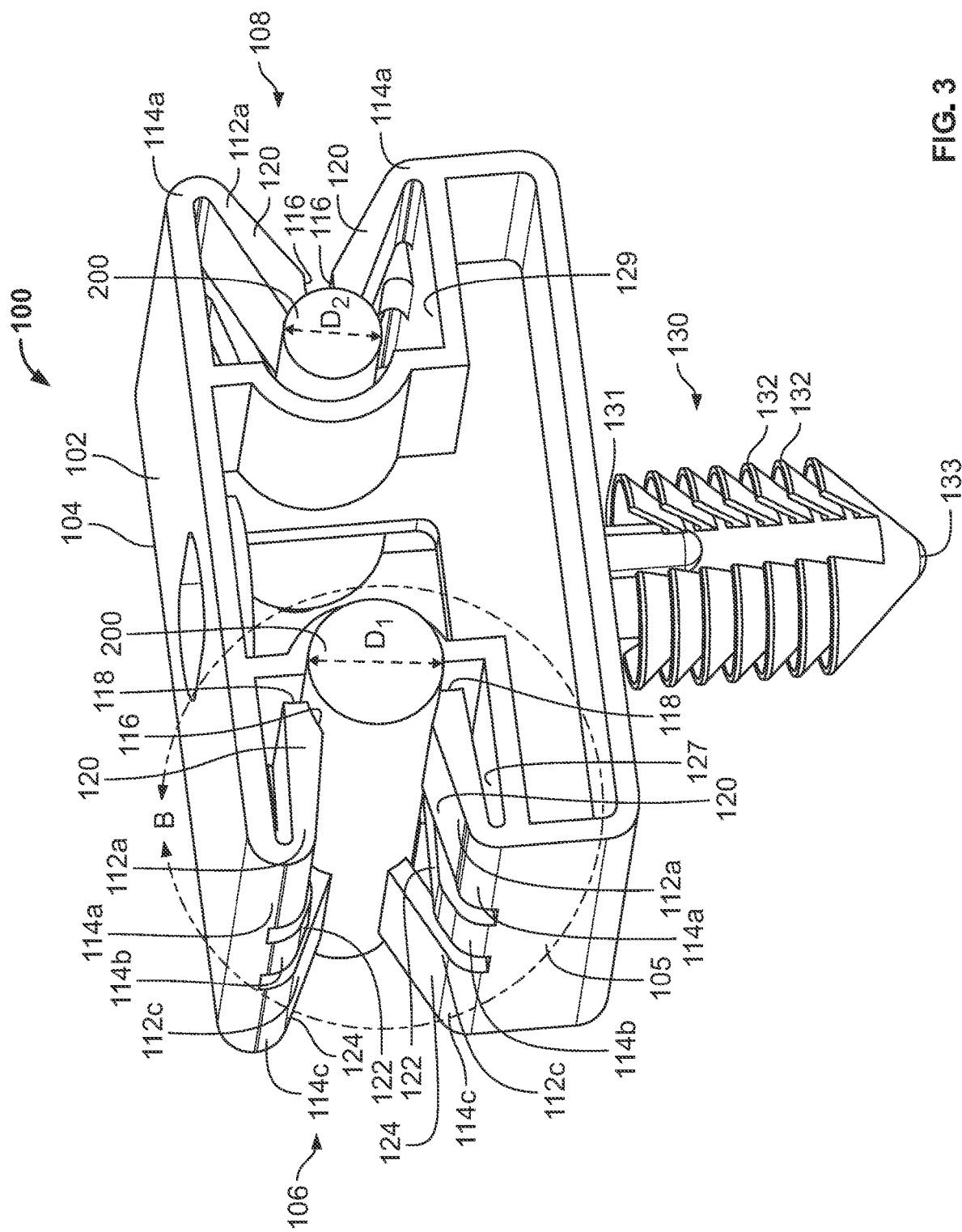
FIG. 3 is a top, front, and right side isometric view of the routing clip assembly shown in FIG. 2.

Turning now to FIG. 2, to insert the tubes 200 into the tube-retaining channels 110, the tubes 200 may be inserted or pressed into the channel 110, and the fingers 112a, 112b, 112c may flex from the closed position toward the open position to allow access to the channels 110. For example, the fingers 112a, 112b of the first pair of fingers 120 and the second pair of fingers 122 are shown in the open position on the lateral side 105 in FIGS. 2-8. In the open position, the fingers 112 are angled relative to respective proximate surfaces 126, 127, 128, or 129 at an angle that is smaller than the angle of the given finger 112 relative to its respective proximate surface 126, 127, 128, or 129 when the finger 112 is in the closed position.

Still referring to FIG. 2, when the tubes 200 are substantially received by the tube-retaining channels 110, some of the fingers 112 may return toward the closed position so that the distal ends 118 contact or abut the tubes 200. However, other fingers 112 may remain in the open position. For example, as shown in FIGS. 2-5 and the cross-sectional view of FIG. 9A, the first and second pairs, respectively 120 and 122, of fingers 112 each remain in the open position on the lateral side 105, and the pairs 120 and 122 of fingers 112a, 112b, 112c tangentially abut against the tube 200 within the tube-retaining section 106.

Still referring to FIG. 2, depending on a diameter D of each inserted tube 200, e.g., D1 or D2, a respective set of fingers 112a, 112b, 112c may flexibly recoil to the closed position after the tube 200 has been inserted into the channel 110, and distal ends 118 of one or more pairs 120, 122, or 124 radially (or substantially-radially) abut against the tube 200 to secure the tube 200 within the channel 110. The closed fingers, e.g. the third pair of fingers 124 as shown in FIG. 4, are primarily responsible for securing the tube 200 within the channel 110.

Figure 4:
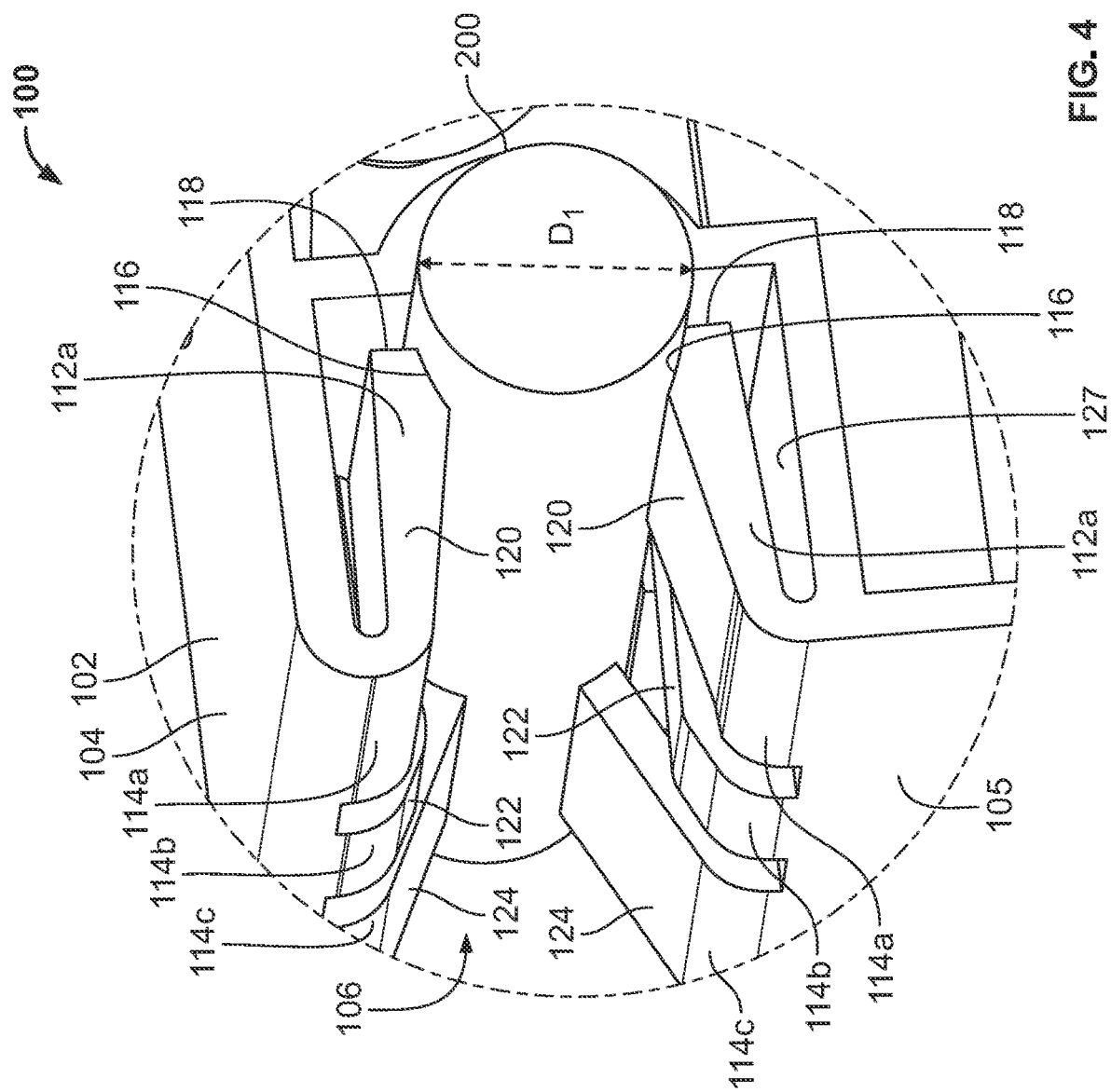
FIG. 4 is an enlarged, detail view showing a channel of the routing clip assembly and fingers of FIG. 3.

In FIG. 4, the fingers 112c of the third pair of fingers 124 are shown in the closed position, securing the tube 200 within the channel 110. At the same time, one or more of the other sets of fingers 112 remain in a first or open configuration following insertion of the tube, i.e. pairs 120 and 122, and the open fingers 112 tangentially abut the tube 200 to prevent the tube moving vertically within the channel, due to vibrations or otherwise. The fingers 112a, 112b, 112c of the present disclosure improve the stability of the tube within the channel 110 and may include shaped abutment surfaces 116. With continued reference to FIG. 4, the fingers 112a include abutment surfaces 116 that are spaced from the distal ends 118, and the abutment surfaces 116 have a concave shape that conforms to the outer surface of the tube 200.

Still referring to FIG. 4, when a relatively larger tube 200 is inserted within the channel 110 (shown in FIG. 1), the tube 200 splays or displaces the fingers 112a of pair 120, and the concave abutment surface 116 tangentially abuts the tube 200 to constrain the vertical movement of the tube 200 within the channel 110. The abutment surfaces 116, such as those of pair 120 shown in FIG. 4, may have a concave shape that conforms to the surface of the tube 200 to increase the contact surface area, thereby increasing the retention strength of the clip 102 on the tube 200 and mitigating relative movement between the tube 200 and the clip 102 within the tube-retaining section 106.

FIGS. 2-8 illustrate the routing clip assembly 100 having two tubes 200 disposed in the tube-retaining sections 106 and 108 defined on the lateral sides 105 and 107 of clip 102. As shown in the illustrated embodiment, and referring particularly to FIG. 4, the distal ends 118 of the fingers 112a, 112b, 112c may be contoured to conform to and support the tubes 200 within the tube-retaining channels 110. In other embodiments, the distal ends 118 may not be contoured.

Referring to FIGS. 2, 3, 5-8, and 9A-9C, two of the tubes 200 are secured within the tube-retaining sections 106 and 108 on opposing lateral sides 105 and 107 of the clip 102. The tube-retaining sections 106 and 108 are identical to one another, to the extent that section 108 is a mirror image of section 106. However, the tube 200 that is secured within section 106 has a first diameter D1, and tube 200 secured within section 108 has a second diameter D2 that is less than the first diameter D1. The tubes 200 may have diameters D1, D2 that are substantially identical in alternative embodiments.

Figure 9A:
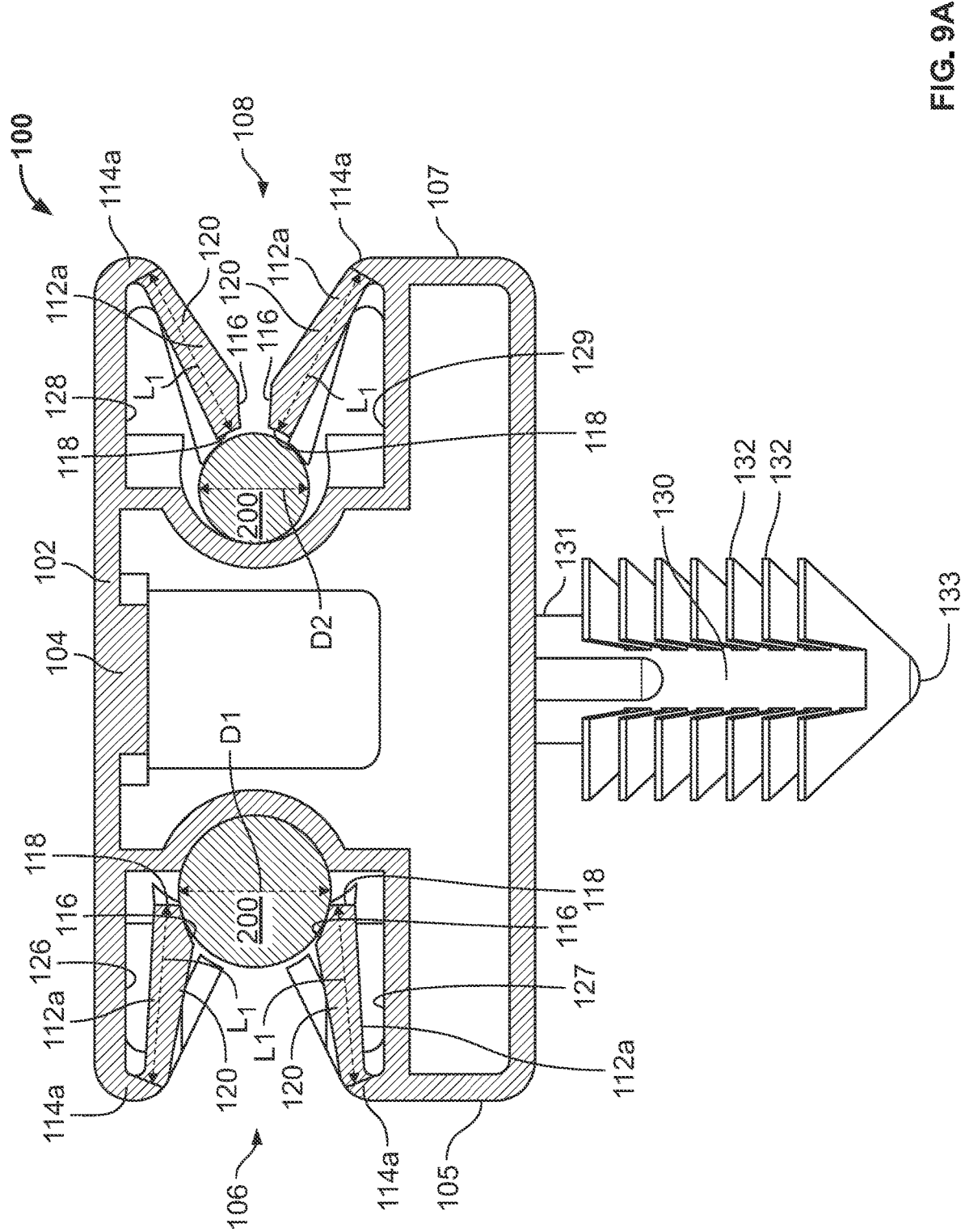
FIG. 9A is a front elevational cross-sectional view taken through the first set of fingers and, more particularly, through line 9A-9A of FIG. 8.
Figure 9B:
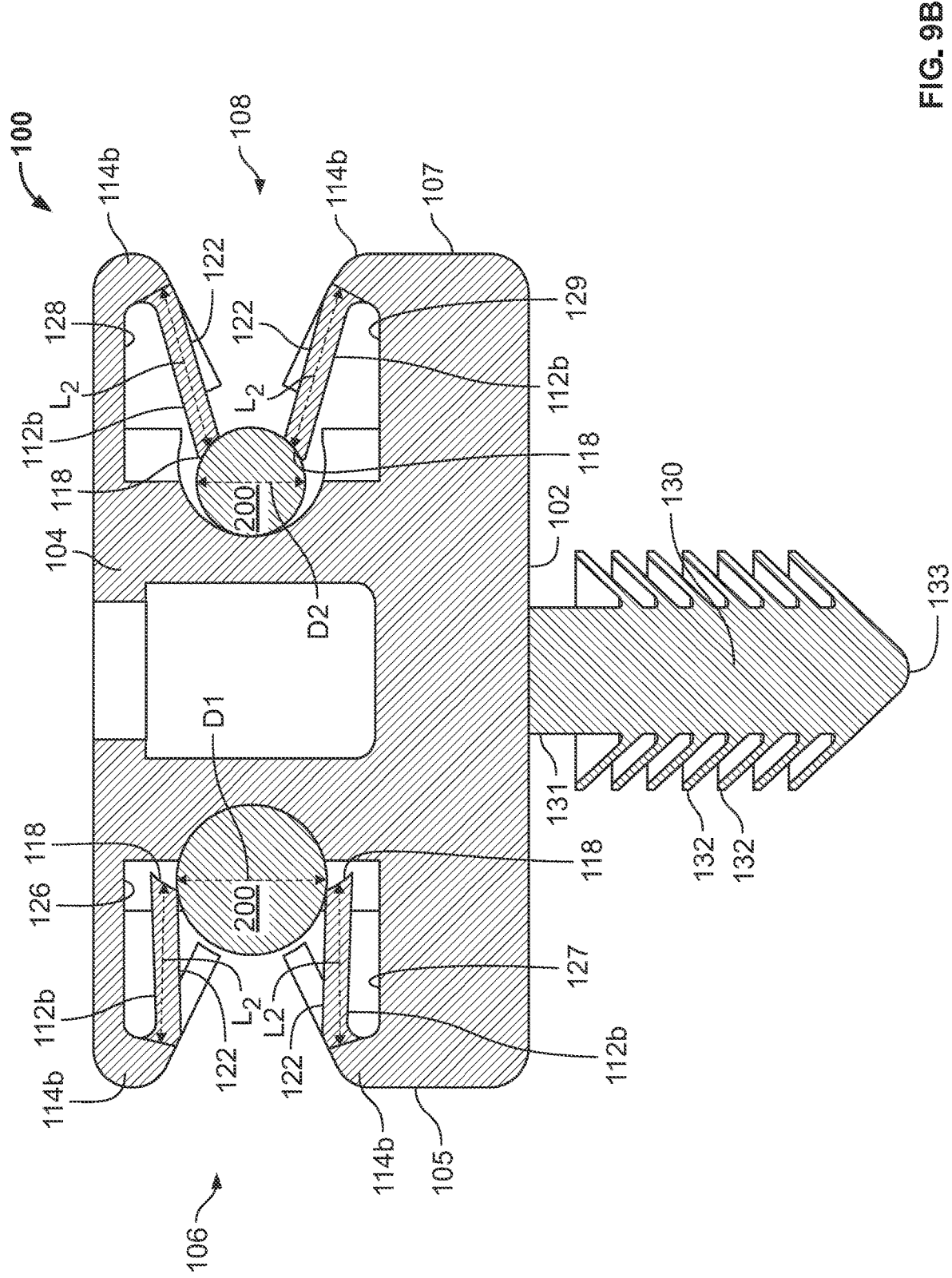
FIG. 9B is a front elevational cross-sectional view taken through the first set of fingers and, more particularly, through line 9B-9B of FIG. 8.
Figure 9C:
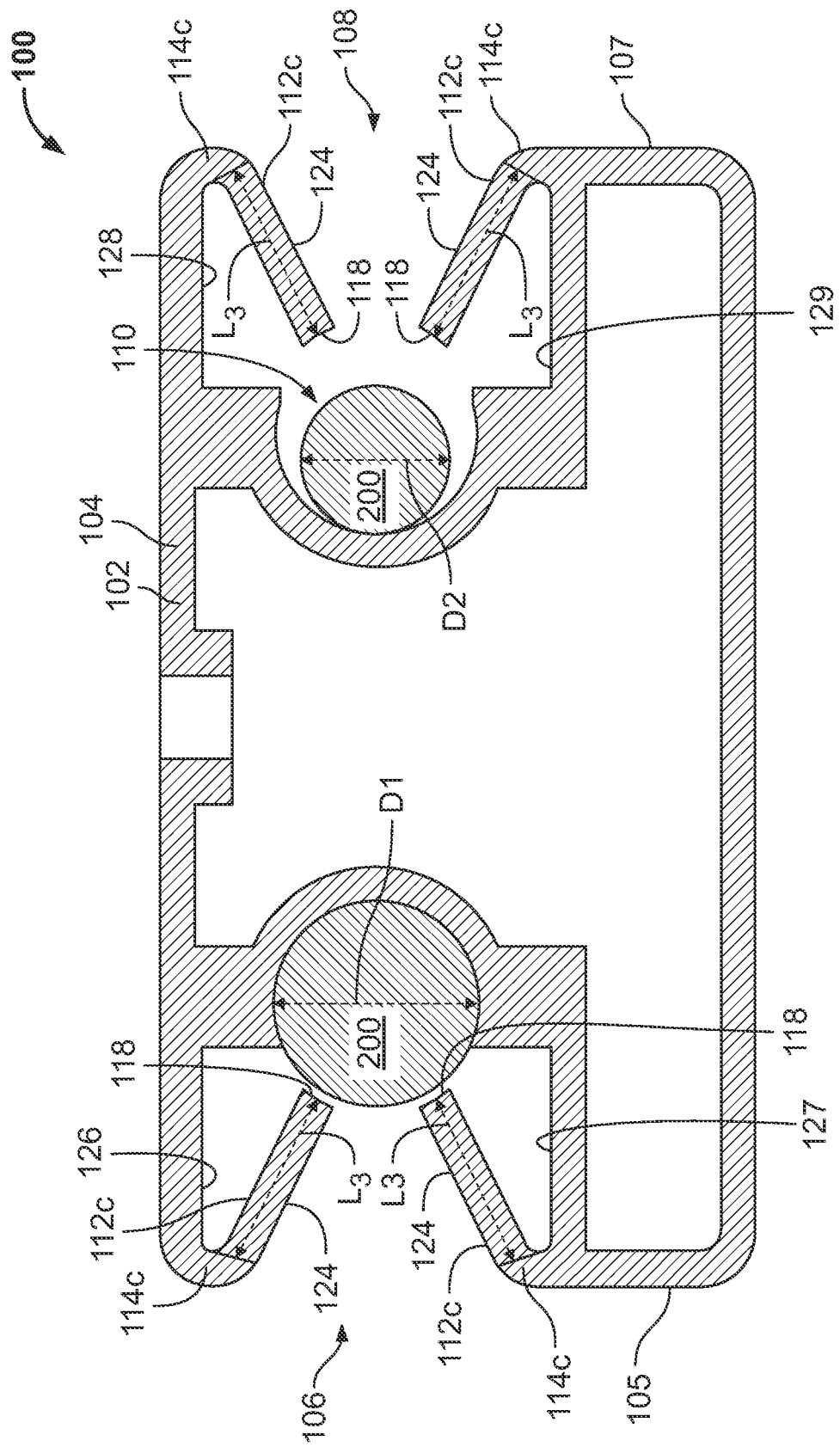
FIG. 9C is a front elevational cross-sectional view taken through the first set of fingers and, more particularly, through line 9C-9C of FIG. 8.

FIGS. 9A-9C illustrate cross-sectional views of the routing clip assembly 100 taken through each of the pairs 120, 122, and 124 of fingers 112a, 112b, 112c. These cross-sectional views are provided to shown how the identical pairs of fingers 112a, 112b, 112c disposed on opposing lateral sides 105 and 107 of the clip 102 can secure tubes 200 having differing diameters D1 and D2. As noted above, the tube 200 that is secured within section 106 on the lateral side 105 is relatively larger than the opposing tube 200 that is inserted into tube-retaining section 108 on lateral side 107.

As illustrated in the cross-sectional views of FIGS. 9A-9C, the fingers 112a, 112b, 112c of each pair of fingers 120, 122, and 124 may have different lengths L1, L2, and L3, and the different lengths allow each of the fingers 112a, 112b, 112c to accommodate a different range of tube diameters. Similarly, one or more of the pairs of the fingers 120, 122, 124 may be disposed at a variety of angles with respect to the main body 104. For example, in the illustrated embodiment, the fingers 112a are shorter than the fingers 112b, thus allowing the first pair of fingers 120 to accommodate tubes 200 having relatively larger diameters. Further, the fingers 112c are shorter than the fingers 112a, thus allowing the fingers 112c to accommodate tubes 200 having diameters that are larger than either of the other pairs 120 or 122 can accommodate.

Referring to FIG. 9A, each finger 112a of the first pair of fingers 120 has a first length L1 that is configured to accommodate a first range of tube diameters. The tube that is secured within section 106 has a diameter D1 that exceeds the first range, so the fingers 112a remain splayed or displaced within the open position and tangentially abut against the tube 200. In this embodiment, the concave abutment surfaces 116 of the pair 120 are spaced from the corresponding distal ends 118, and the concave surfaces 116 increase the contact area between the tube 200 and the pair 120. Conversely, the tube 200 that is secured within section 108 has a diameter D2 that is smaller than the first range. Thus, the first pair of fingers 120 on lateral side 107 flexibly recoils to the closed position following insertion of the tube 200, and the distal ends 118 lie adjacent to the tube 200. The distal ends of pair 120 are concavely shaped to increase the contact surface area while directing the tube toward the channel axis "A" (shown in FIG. 1).

Still referring to FIG. 9A, the first length L1 of the fingers 112a of the first pair of fingers 120 may be configured to accommodate tubes having a diameter of between about 4.7 mm and about 32 mm, or between about 4.7 mm and about 6.4 mm, or between about 7.9 mm and about 16 mm, or between about 6.4 mm and about 25.4 mm, or between about 7.9 mm and about 19.1 mm, or between about 9.5 mm and about 16 mm, or about 4.8 mm, or about 6.4 mm, or about 7.9 mm, or about 9.5 mm, or about 12.7 mm, or about 15.9 mm, or about 19.1 mm, or about 25.4 mm, or about 31.8 mm.

Figure 5:
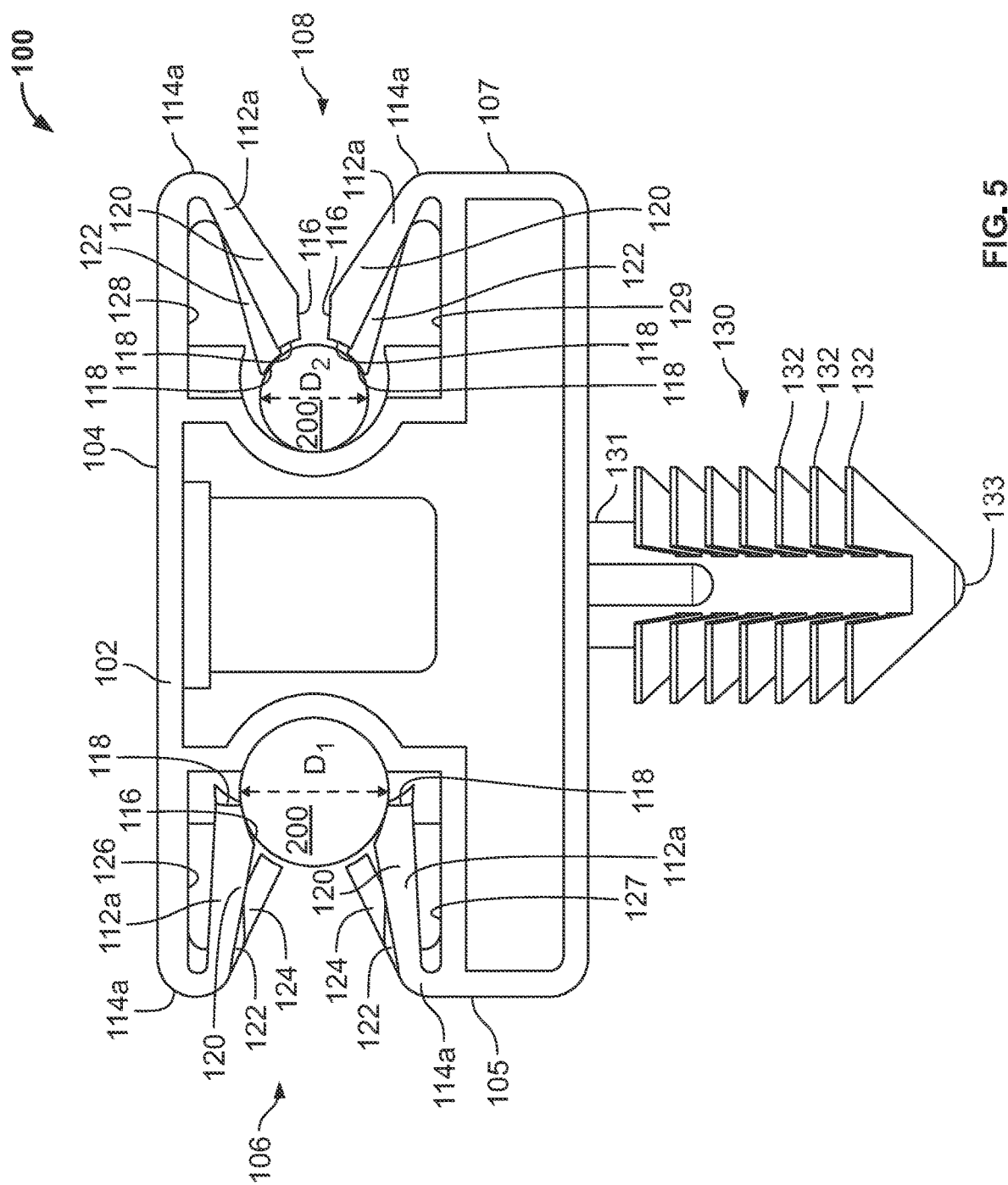
FIG. 5 is a front elevational view of the routing clip assembly of FIG. 2.
Figure 6:
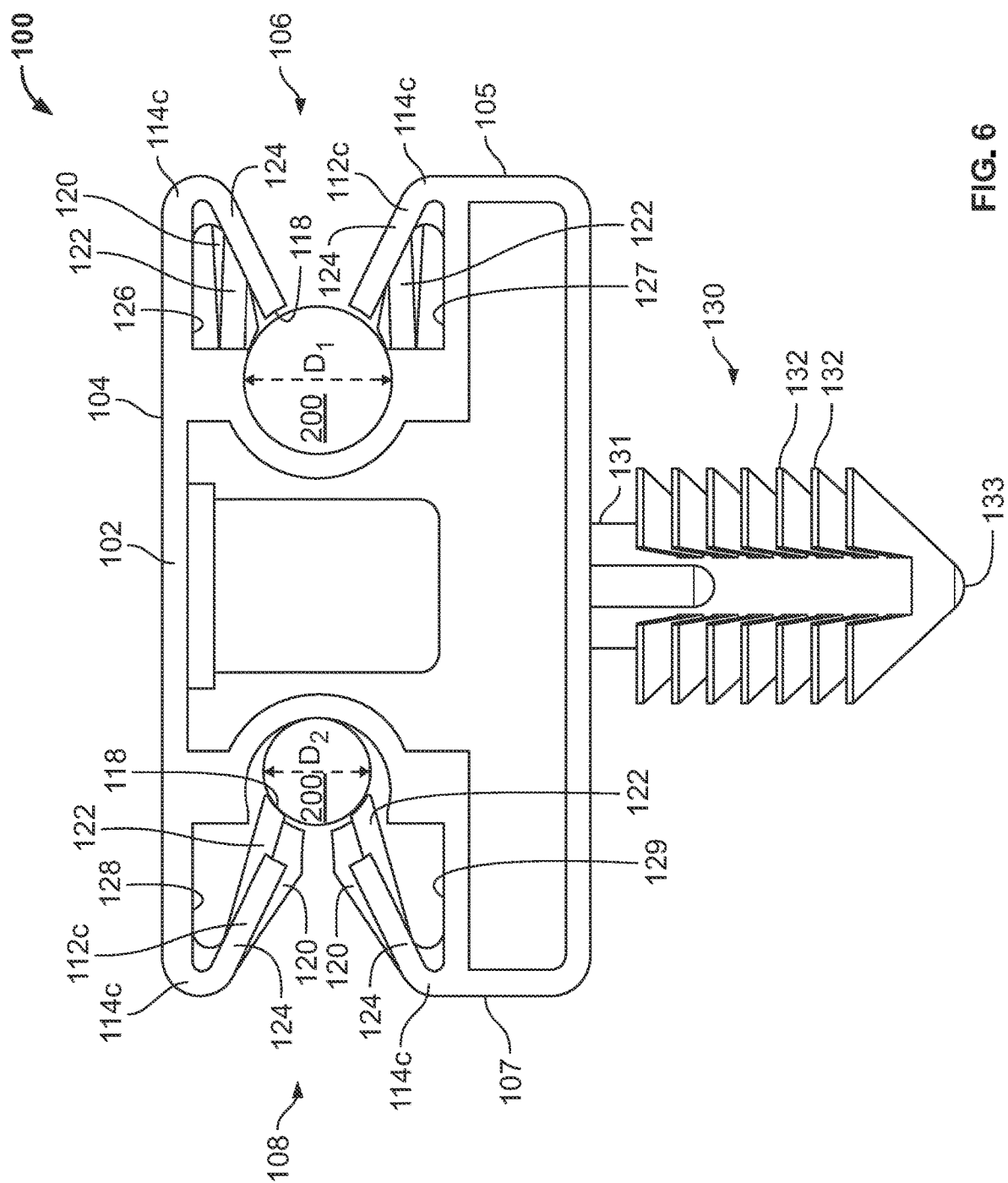
FIG. 6 is a rear elevational plan view of the routing clip assembly of FIG. 2.
Figure 7:
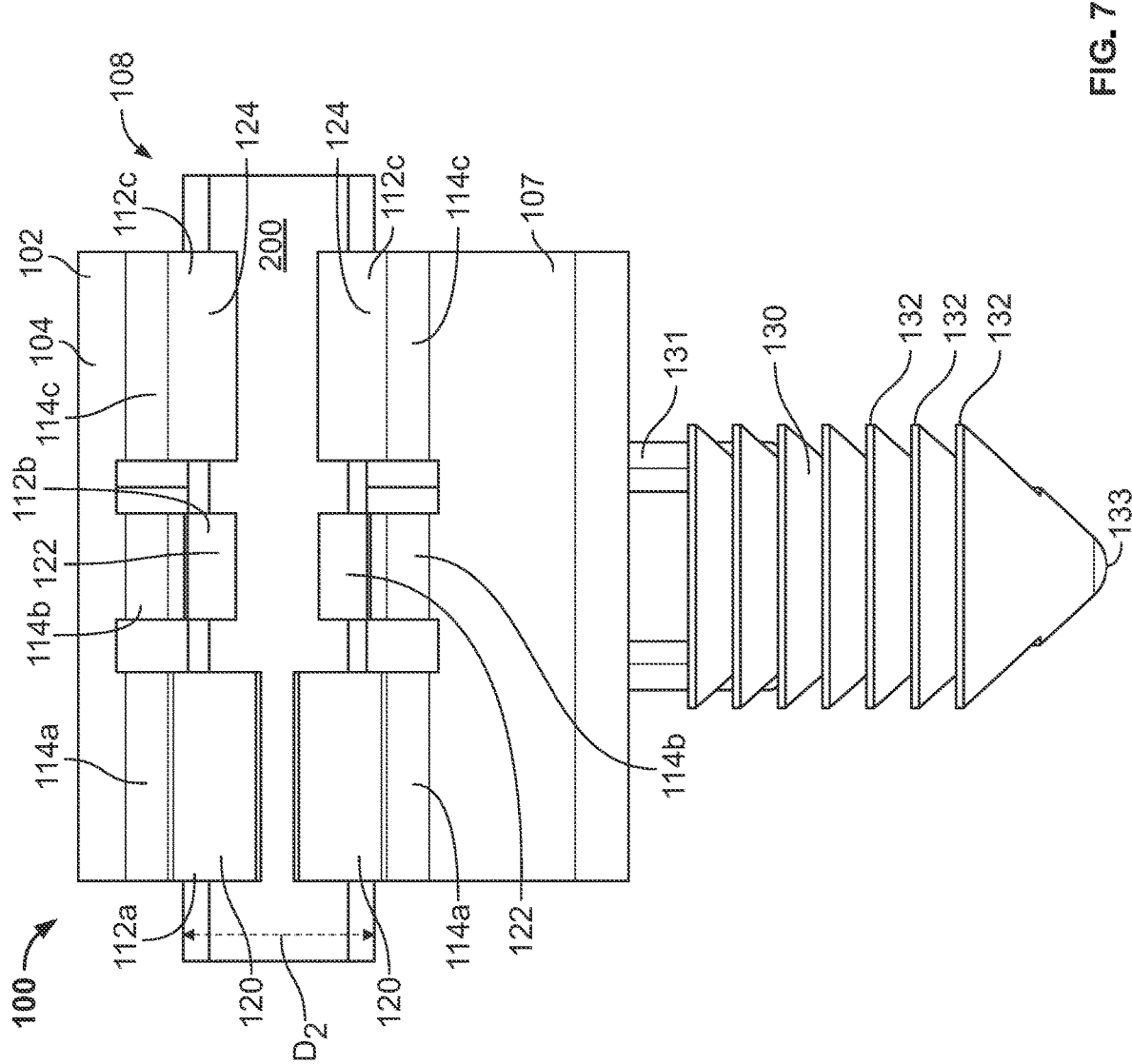
FIG. 7 is a left side elevational view of the routing clip assembly of FIG. 2.
Figure 8:
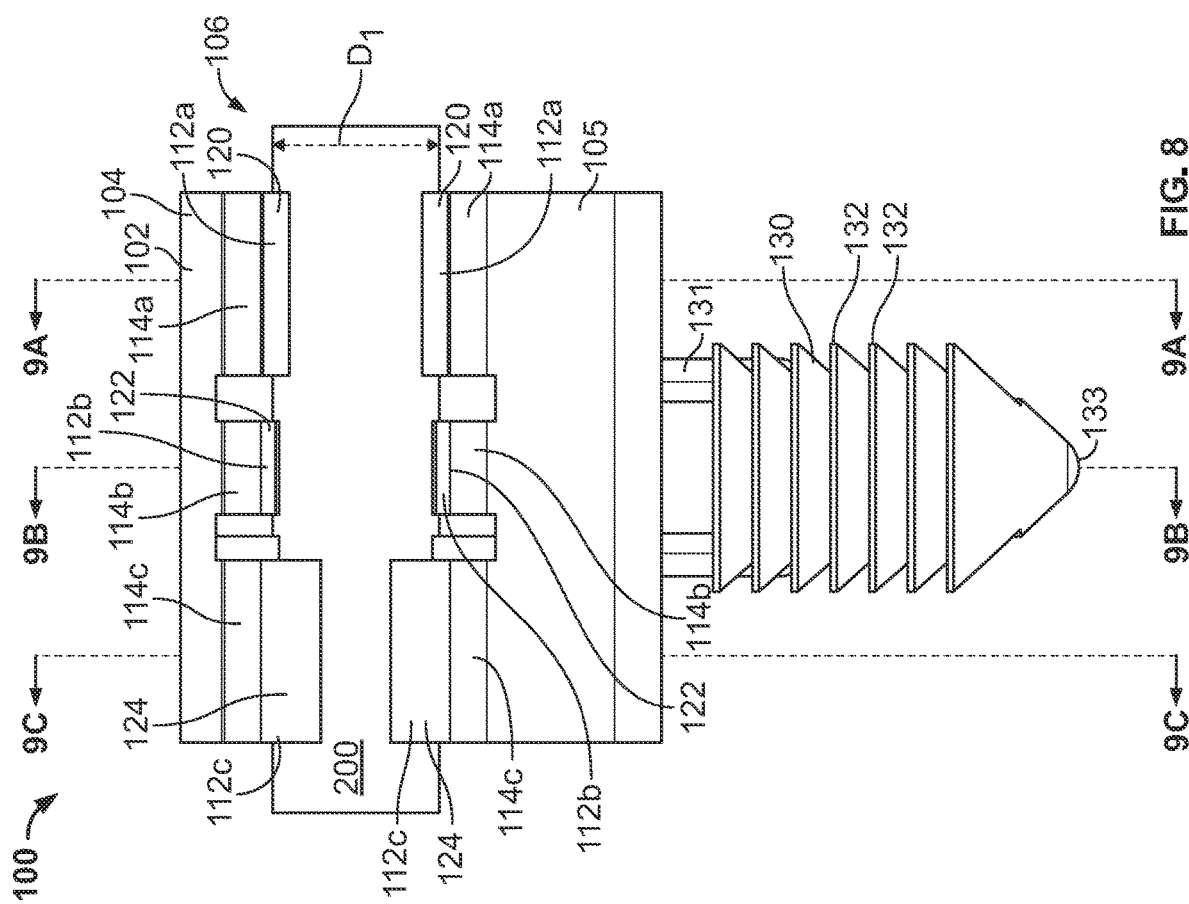
FIG. 8 is a right side elevational view of the routing clip assembly of FIG. 2.

With reference to FIGS. 5, 6, and 9B, the tube-retaining section 108 on the lateral side 107 includes the fingers 112b of the second pair of fingers 122 having contoured distal ends 118 that abut against the tube 200. The second pair of fingers 112b each have a second length L2 that can accommodate a second range of tube diameters, and the tube 200 (within retaining section 108) has a diameter D2 that lies within the second range. As such, the contoured distal ends 118 of the pair 122 abut the tube 200, and the fingers 112b of pair 122 are angled substantially radially with respect to tube 200. On the opposing lateral side 105, the tube 200 (within retaining section 106) has a diameter D1, and diameter D1 exceeds the second range of tube diameters that can be accommodated by second length L2. Thus, the second pair of fingers 122 remains splayed in the open position and tangentially abuts the tube 200.

Still referring to FIG. 9B, the second length L2 of the fingers 112b of the second pair of fingers 122 may be configured to accommodate tubes having a diameter of between about 4.7 mm and about 32 mm, or between about 4.7 mm and about 6.4 mm, or between about 7.9 mm and about 16 mm, or between about 6.4 mm and about 25.4 mm, or between about 7.9 mm and about 19.1 mm, or between about 9.5 mm and about 16 mm, or about 4.8 mm, or about 6.4 mm, or about 7.9 mm, or about 9.5 mm, or about 12.7 mm, or about 15.9 mm, or about 19.1 mm, or about 25.4 mm, or about 31.8 mm.

Referring to FIG. 9C, each of the fingers 112c of the third pair 124 has a third length L3 that accommodates a third range of tube diameters. The tube 200 secured within section 106 has a diameter D1, which is within the third range. As such, the fingers 112c of the third pair of fingers 124 flexibly recoil to the closed position following insertion of the tube 200, and the distal ends 118 lie adjacent to the tube 200 within section 106. On the opposing lateral side 107, diameter D2 of tube 200 is smaller than the third range, so the third pair of fingers 124 on lateral side 107 are shown in the closed position and spaced apart from the tube 200.

Still referring to FIG. 9C, the third length L3 of the fingers 112c of the third pair of fingers 124 may be configured to accommodate tubes having a diameter of between about 4.7 mm and about 32 mm, or between about 4.7 mm and about 6.4 mm, or between about 7.9 mm and about 16 mm, or between about 6.4 mm and about 25.4 mm, or between about 7.9 mm and about 19.1 mm, or between about 9.5 mm and about 16 mm, or about 4.8 mm, or about 6.4 mm, or about 7.9 mm, or about 9.5 mm, or about 12.7 mm, or about 15.9 mm, or about 19.1 mm, or about 25.4 mm, or about 31.8 mm.

To remove the tubes 200 from the tube-retaining channels 110, each pair 120, 122, and 124 of fingers 112a, 112b, 112c are flexed or retracted from a second or closed configuration toward the open or first configuration, thereby un-obstructing the channel 110 to allow removal of the tubes 200.

While the embodiments shown herein depict pairs 120, 122, and 124 of fingers 112a, 112b, 112c that can accommodate tubes of two different diameters, it is also contemplated that the pairs 120, 122, and 124 of fingers 112a, 112b, 112c could accommodate more than two different diameters and/or more pairs of fingers may be utilized to accommodate more diameters.

Thus, embodiments disclosed herein provide an assembly that securely engages around tubes, pipes, conduits, or the like through more than just a circular tube opening. Embodiments provide adaptable tube-engaging fingers that extend into tube channels to securely engage around tubes, pipes, conduits, and the like of varying shapes and sizes. Each set of fingers engages the tubes, either radially or tangentially, to secure the tube within the channel or mitigate movement of the tube relative to the channel.

The adaptable tube-engaging fingers that are shown and described accommodate multiple tube diameters without changing a centerline horizontal distance from one another, and/or from a mounting point. While the adaptable tube-engaging members may flex toward or away from the center of the receiving channel, the tubes secured therein remain constantly centered due to the conforming engagement of the adaptable tube-engaging members around more than half a circumference of each tube. Further, by wrapping around more than 180° of a tube, the channel of the tube-engaging section provides a higher axial slide/thrust force than previous assemblies.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

While the device disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms "about" and "approximately" mean plus or minus 5% of the number that each term precedes.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative embodiments of the present disclosure. The claims are to be construed to include alternative embodiments to the extent permitted by the prior art.

Various features of the disclosure are set forth in the following claims.

I claim:

1. A routing clip assembly configured to secure a tube to a structure, the assembly including:
   a clip having a main body including at least one tube-retaining section defined on a lateral side, the tube retaining section including:
      a channel configured to receive a tube, wherein the channel is configured to accommodate a variety of tube diameters and defines a channel axis;
      at least two pairs of fingers, wherein each finger of a given pair connects to the main body at a respective hinge on a side of the channel opposite the other finger of the given pair, wherein the at least two pairs of fingers are configured to flex between a closed position and an open position to permit insertion of the tube into the channel, and each of the fingers has a distal end that extends generally toward the channel axis, the at least two pairs of fingers including:
         a first pair of fingers configured to accommodate a first range of tube diameters;
         a second pair of fingers being configured to accommodate a second range of tube diameters that differs from the first range of tube diameters; and
         a third pair of fingers,
   wherein when a diameter of the tube received within the channel exceeds the first range, the first pair of fingers is in the open position, the second pair of fingers is in the open position, and the third pair of fingers is in the closed position, wherein the distal end of each finger of the third pair of fingers radially abut against the tube, and the abutment surfaces of the first pair of fingers tangentially abut against the tube to mitigate movement of the tube relative to the main body,
   wherein, following insertion of a first tube having a first diameter that is within the first range of tube diameters into the channel, the first pair of fingers returns to the closed position and distal ends of the first pair of fingers abut against the first tube, and the second pair of fingers remains in the open position, the second pair of fingers tangentially abutting the first tube at concave abutment surfaces.

2. The routing clip assembly of claim 1, wherein the distal end of each of the fingers of at least one of the pairs of fingers are configured to abut directly against the tube in a radial configuration to retain the tube within the channel.

3. The routing clip assembly of claim 1, wherein the distal end of each of the fingers of at least one of the pairs of fingers define a concave shape that is configured to conform to a curved outer surface of the tube.

4. The routing clip assembly of claim 1, wherein each of the fingers of at least one of the pairs of fingers includes an abutment surface that is spaced apart from the distal end of the finger, the abutment surface being configured to tangentially abut against the tube to mitigate movement of the tube relative to the main body.

5. The routing clip assembly of claim 4, wherein the abutment surface defines a concave shape configured to conform to a curved outer surface of the tube.

6. The routing clip assembly of claim 4, wherein when a tube diameter exceeds the first range, the abutment surfaces tangentially abut against the tube to mitigate movement of the tube relative to the main body.

7. The routing clip assembly of claim 1, wherein the third pair of fingers is disposed adjacent to one of the first pair of fingers and the second pair of fingers, wherein the first pair of fingers, the second pair of fingers, and the third pair of fingers are axially spaced along the channel.

8. The routing clip assembly of claim 7, wherein the third pair of fingers is configured to accommodate a third range of tube diameters that differs from the first range and differs from the second range.

9. The routing clip assembly of claim 1, wherein the clip further includes a shank integrally formed with and extending from the main body, the shank including:
   a proximal end in connection with the main body;
   a distal tip spaced apart from the main body; and
   a plurality of flexible flanges that extend radially outward from the shank between the proximal end and the distal tip,
   wherein the shank is configured to be inserted through an aperture in an object, and
   wherein at least one of the plurality of flexible flanges abuts against an interior edge of the aperture to retain the clip in connection with the object.

10. A routing clip assembly configured to secure a tube to a structure, wherein the routing clip assembly is configured to accommodate a variety of tubes having a range of diameters, the routing clip assembly including:
   a routing clip configured to receive the tube, the routing clip including a body, and a tube-retaining section being defined on the body, the tube-retaining section including a channel adapted for receipt of the tube, the tube-retaining section further including:
      a first pair of fingers having distal ends extending within the channel, the first pair of fingers connecting to the body at corresponding hinges on opposing sides of the channel, wherein the first pair of fingers have a first length defined between the corresponding hinge and the distal end, and the first length is configured to accommodate a first range of tube diameters,
      a second pair of fingers having distal ends extending within the channel, the second pair of fingers connecting to the body at corresponding hinges on opposing sides of the channel, the second pair of fingers having a second length defined between the corresponding hinge and the distal end, the second length being different from the first length, and being configured to accommodate a second range of tube diameters, each finger of the second pair of fingers including a concave abutment surface that is spaced from the distal end, and
      a third pair of fingers having distal ends extending within the channel, the third pair of fingers connecting to the body at corresponding hinges on opposing sides of the channel, the third pair of fingers having a third length defined between the corresponding hinge and the distal end, the third length being different from both the first length and the second length, and being configured to accommodate a third range of tube diameters,
   wherein each finger of the first pair of fingers includes a concave abutment surface that is spaced from the distal end, and wherein, for a tube diameter that exceeds the first range, the concave abutment surface tangentially abuts against the tube when the tube is received within the channel, wherein the second pair of fingers are axially spaced from the first pair of fingers, wherein the third pair of fingers are axially spaced from the first pair of fingers and the second pair of fingers, wherein for a tube diameter that exceeds the second range, the concave abutment surface tangentially abuts against the tube when the tube is received within the channel.

11. The routing clip assembly of claim 10, wherein the distal end of each of the fingers of the first pair of fingers have a concave shape and are configured to conform to a curved outer surface of a tube.

12. The routing clip assembly of claim 10, wherein the clip further includes a shank integrally formed with and extending from the body, the shank including:
 a proximal end in connection with the body;
 a distal tip spaced apart from the body; and
 a plurality of flexible flanges that extend radially outward from the shank between the proximal end and the distal tip,
 wherein the shank is configured to be inserted through an aperture in an object, and wherein at least one of the plurality of flexible flanges abuts against an interior edge of the aperture to retain the clip in connection with the object.

13. A routing clip assembly comprising a routing clip in connection with at least one tube, the routing clip being configured to secure the tube to a structure, the routing clip including:
 a main body;
 a shank protruding from the main body and including radially-disposed flanges;
 a tube-retaining section being defined on the main body; and
 at least one channel being defined in the tube-retaining section, the at least one channel being configured to accommodate a variety of tube diameters, the at least one channel including:
  a first pair of opposed fingers; and
  a second pair of opposed fingers disposed adjacent to the first pair,
 wherein each of the first pair and second pair of opposed fingers connect to the main body at respective hinges on opposing sides of the channel, and each finger structurally mirrors the other finger of the respective pair;
 wherein the first and second pairs of opposed fingers are naturally disposed in a closed position and flex to an open position to permit insertion of a tube into the channel, wherein, following insertion of a first tube into the channel, the first pair of opposed fingers returns to the closed position and distal ends of the first pair of opposed fingers abut against the first tube, and the second pair of fingers remains in the open position, wherein the second pair of fingers tangentially abut the first tube at concave abutment surfaces, and wherein the distal ends of the first pair of opposed fingers are shaped to conform with a curvature of the first tube.

14. The routing clip assembly of claim 13, further comprising a third pair of opposed fingers, wherein each finger of the third pair of opposed fingers connects to the main body at a corresponding hinge on an opposing side of the channel from the other finger of the third pair of opposed fingers, and each finger of the third pair of opposed fingers structurally mirrors the other finger of the third pair of opposed fingers.

15. The routing clip assembly of claim 14, wherein each finger of the first pair of opposed fingers has a first length defined between the corresponding hinge and the distal end, and the first length is configured to accommodate a first range of tube diameters.

16. The routing clip assembly of claim 13, wherein the routing clip further includes a second tube-retaining section defined on an opposing side of the main body from the tube-retaining section, the second tube-retaining section defining a second channel configured to accommodate a variety of tube diameters.

17. The routing clip assembly of claim 13, wherein each finger of the first pair of opposed fingers includes a concave abutment surface that is spaced from the distal end.

18. The routing clip assembly of claim 1, wherein the clip further includes a shank protruding from the main body and including radially-disposed flanges.

19. The routing clip assembly of claim 1, wherein the clip further includes a second channel configured to receive a tube, wherein the second channel is configured to accommodate a variety of tube diameters and defines a second channel axis.

20. The routing clip assembly of claim 19, wherein the channel and the second channel are disposed on opposing lateral sides of the clip.

21. The routing clip assembly of claim 19, wherein the second channel includes at least two pairs of fingers, wherein each finger of a given pair connects to the main body at a respective hinge on a side of the second channel opposite the other finger of the given pair.

* * * * *